US011301826B2

(12) United States Patent
Sueyoshi et al.

(10) Patent No.: US 11,301,826 B2
(45) Date of Patent: Apr. 12, 2022

(54) INFORMATION PROCESSING APPARATUS AND INFORMATION PROCESSING SYSTEM

(71) Applicant: SONY CORPORATION, Tokyo (JP)

(72) Inventors: Masahiro Sueyoshi, Kanagawa (JP); Yuji Hiura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/619,130

(22) PCT Filed: May 2, 2018

(86) PCT No.: PCT/JP2018/017511

§ 371 (c)(1),
(2) Date: Dec. 4, 2019

(87) PCT Pub. No.: WO2018/230185

PCT Pub. Date: Dec. 20, 2018

(65) Prior Publication Data

US 2020/0118104 A1 Apr. 16, 2020

(30) Foreign Application Priority Data

Jun. 13, 2017 (JP) .............................. JP2017-115914

(51) Int. Cl.
| | | |
|---|---|---|
| G06Q 20/16 | (2012.01) | |
| G06Q 20/24 | (2012.01) | |
| G06Q 20/38 | (2012.01) | |
| G06Q 20/40 | (2012.01) | |
| G06Q 20/02 | (2012.01) | |
| G06Q 20/32 | (2012.01) | |
| H04L 9/32 | (2006.01) | |
| G07F 7/08 | (2006.01) | |

(52) U.S. Cl.
CPC ............ *G06Q 20/16* (2013.01); *G06Q 20/24* (2013.01); *G06Q 20/3827* (2013.01); *G06Q 20/4012* (2013.01); *H04L 9/3226* (2013.01)

(58) Field of Classification Search
CPC .... G06Q 20/16; G06Q 20/24; G06Q 20/3827; G06Q 20/4012; G06Q 20/38;
(Continued)

(56) References Cited

U.S. PATENT DOCUMENTS 6,824,049 B2 * 11/2004 Lee ..................... G06Q 20/00
235/379
7,882,021 B2 * 2/2011 Baumgartner ....... G06Q 40/025
705/38

(Continued)

FOREIGN PATENT DOCUMENTS

| EP | 2733654 A1 | 5/2014 |
| GB | 2478712 A | 9/2011 |

(Continued)

OTHER PUBLICATIONS

International Search Report and Written Opinion of PCT Application No. PCT/JP2018/017511, dated Jun. 5, 2018, 08 pages of ISRWO.

(Continued)

*Primary Examiner* — Clifford B Madamba
(74) *Attorney, Agent, or Firm* — Chip Law Group (57) ABSTRACT

An information processing apparatus and an information processing system that enable a settlement at a real shop without complicated operation is proposed. There is provided an information processing apparatus including: a unique information acquisition unit that acquires unique information, regarding a settlement at a real shop, generated by a user terminal via a real-shop terminal; a verification unit that verifies the unique information; and a settlement processing unit that sends the unique information to a settlement service provider so that the settlement service provider performs settlement processing on the basis of the unique information.

8 Claims, 10 Drawing Sheets

(58) Field of Classification Search
CPC ...... G06Q 20/02; G06Q 20/32; H04L 9/3226; H04L 9/32; G07F 7/08
USPC .......................................................... 705/44
See application file for complete search history.

(56) References Cited

U.S. PATENT DOCUMENTS

| | | | | |
|---|---|---|---|---|
| 2003/0061156 | A1* | 3/2003 | Lim .......................... | G07F 7/08 |
| | | | | 705/39 |
| 2004/0153398 | A1* | 8/2004 | Baumgartner ......... | G06Q 20/04 |
| | | | | 705/39 |
| 2008/0021821 | A1* | 1/2008 | Katyal ................... | G06Q 20/24 |
| | | | | 705/40 |

FOREIGN PATENT DOCUMENTS

| | | |
|---|---|---|
| JP | 2002-063348 A | 2/2002 |
| JP | 2015-060262 A | 3/2015 |
| JP | 2015-185089 A | 10/2015 |
| WO | 2008/059465 A2 | 5/2008 |
| WO | 2013/149200 A1 | 10/2013 |
| WO | 2013/155627 A1 | 10/2013 |

OTHER PUBLICATIONS

Office Action for EP Patent Application No. 18817122.7, dated Sep. 22, 2021, 06 pages of Office Action.

* cited by examiner

INFORMATION PROCESSING APPARATUS AND INFORMATION PROCESSING SYSTEM

CROSS REFERENCE TO RELATED APPLICATIONS

This application is a U.S. National Phase of International Patent Application No. PCT/JP2018/017511 filed on May 2, 2018, which claims priority benefit of Japanese Patent Application No. JP 2017-115914 filed in the Japan Patent Office on Jun. 13, 2017. Each of the above-referenced applications is hereby incorporated herein by reference in its entirety.

TECHNICAL FIELD

The present disclosure relates to an information processing apparatus and an information processing system.

BACKGROUND ART

Conventionally, for example, Patent Document 1 below describes a shop settlement terminal to be lent to a product consumer at a shop. In the shop settlement terminal, settlement methods in which a settlement can be made for determining the total price of products are presented. A settlement execution instruction from the consumer in a settlement method selected from the presented settlement methods is received. Processing in accordance with the selected settlement method is performed.

CITATION LIST

Patent Document

Patent Document 1: Japanese Patent Application Laid-Open No. 2015-185089

SUMMARY OF THE INVENTION

Problems to be Solved by the Invention

In the technique described in Patent Document 1 above, however, association between information for specifying a settlement method and information for specifying a user is not considered. The user thus needs to select the settlement method at the time of settlement. As a result, there has been a problem that complicated operation is required to a shop settlement terminal during shopping at a real shop. Furthermore, in the technique described in Patent Document 1 above, there is a problem that a settlement method that can be used for a settlement is limited on the side of a real-shop terminal, and significant modification of a system is required for introducing a new settlement method.

Thus, the present disclosure proposes a new and improved information processing apparatus and information processing system that enable a settlement at a real shop without complicated operation.

Solutions to Problems

According to the present disclosure, there is provided an information processing apparatus including: a unique information acquisition unit that acquires unique information, regarding a settlement at a real shop, generated by a user terminal via a real-shop terminal; a verification unit that verifies the unique information; and a settlement processing unit that sends the unique information to a settlement service provider so that the settlement service provider performs settlement processing on the basis of the unique information.

Furthermore, according to the present disclosure, there is provided an information processing system including: a user terminal that generates unique information regarding a settlement at a real shop; a real-shop terminal that is installed in a real shop and that acquires the unique information from the user terminal; an information processing apparatus including: a unique information acquisition unit; a verification unit; and a settlement processing unit, the unique information acquisition unit acquiring the unique information from the real-shop terminal, the verification unit verifying the unique information, the settlement processing unit sending the unique information to a settlement service provider so that the settlement service provider performs settlement processing on the basis of the unique information; and a settlement-service-provider terminal that corresponds to a terminal of the settlement service provider and makes a settlement on the basis of the unique information.

Effects of the Invention

According to the present disclosure, an information processing apparatus and an information processing system that enable a settlement at a real shop without complicated operation can be provided as described above.

Note that the above-described effect is not necessarily limited, and, along with or in place of the above-described effect, any of the effects illustrated in the present specification, or other effects that can be grasped from the present specification may be exhibited.

MODE FOR CARRYING OUT THE INVENTION

A preferred embodiment of the present disclosure will be described in detail below with reference to the accompanying drawings. Note that, in the present specification and the drawings, components having substantially the same functional configuration will be assigned the same signs and redundant description will be omitted.

Note that the description will be given in the following order.
1. Background
2. Configuration Example of System
3. Prior Registration Processing 4. Settlement Processing
5. Processing Performed in User Terminal
6. Example of Data Management in Settlement Gateway

1. BACKGROUND

The development of the Internet in recent years expands opportunities of making settlements on the Internet during, for example, internet shopping. In contrast, settlements after seeing an actual product at a real shop are still made. In a case of making a settlement at a real shop, many settlement ways based on, for example, a credit card, electronic money, and a QR code (registered trademark) are presented at present, and each of the ways claims superiority. The real shop needs to select an applicable settlement service provider, and build a system appropriate to the provider in the shop. Settlement ways are not standardized in each real shop, and a system needs to be built in accordance with a settlement way. As a result, in a case where one shop newly adds a settlement service provider, the shop has a major burden of altering a real-shop terminal.

Furthermore, in a case of making a settlement at a real shop, information for specifying a settlement of a settlement service provider and information for specifying a user are not associated with each other at present. For this reason, a user needs to pass information necessary for a settlement, such as credit card information, to the real shop at the time of settlement. In contrast, in transactions via the Internet, if an account (e.g., e-mail address) and credit card information of a user are preliminarily associated and registered, a product can be bought without newly inputting the credit card information as long as login to the account of the user is performed. In shopping at a real shop, such a settlement based on user account authentication cannot be made.

Thus, in the embodiment, a settlement is processed via a settlement gateway in settlement at a real shop. The settlement gateway manages a plurality of types of settlement means and user information. Since the settlement gateway determines the type of settlement, the real shop can use a terminal without customizing the terminal for each settlement service provider.

In order to achieve secure authentication and data transfer with respect to the settlement gateway, secure writing and reading of user information using keyed access with FeliCa (registered trademark) and falsification detection accompanying the data transfer to the settlement gateway are performed. Furthermore, settlement at the real shop is achieved in a way used on the Internet by account authentication using a user ID (user identification information) of a user.

In order to achieve settlement means, the embodiment includes not only RF for near field communication but a means such as a credit card and a QR code (registered trademark). Furthermore, a settlement can be made by using information regarding an account used by a user on the Internet. Specifically, settlement processing can be performed by, for example, electronic money, settlement way presented by various settlement service providers, a credit card, and a QR code (registered trademark) on the basis of the account information. Furthermore, the embodiment can be applied not only to a stored value type but a server management type by specifying a settlement means and settlement auxiliary information. Details will be described below.

2. CONFIGURATION EXAMPLE OF SYSTEM

Figure 1:
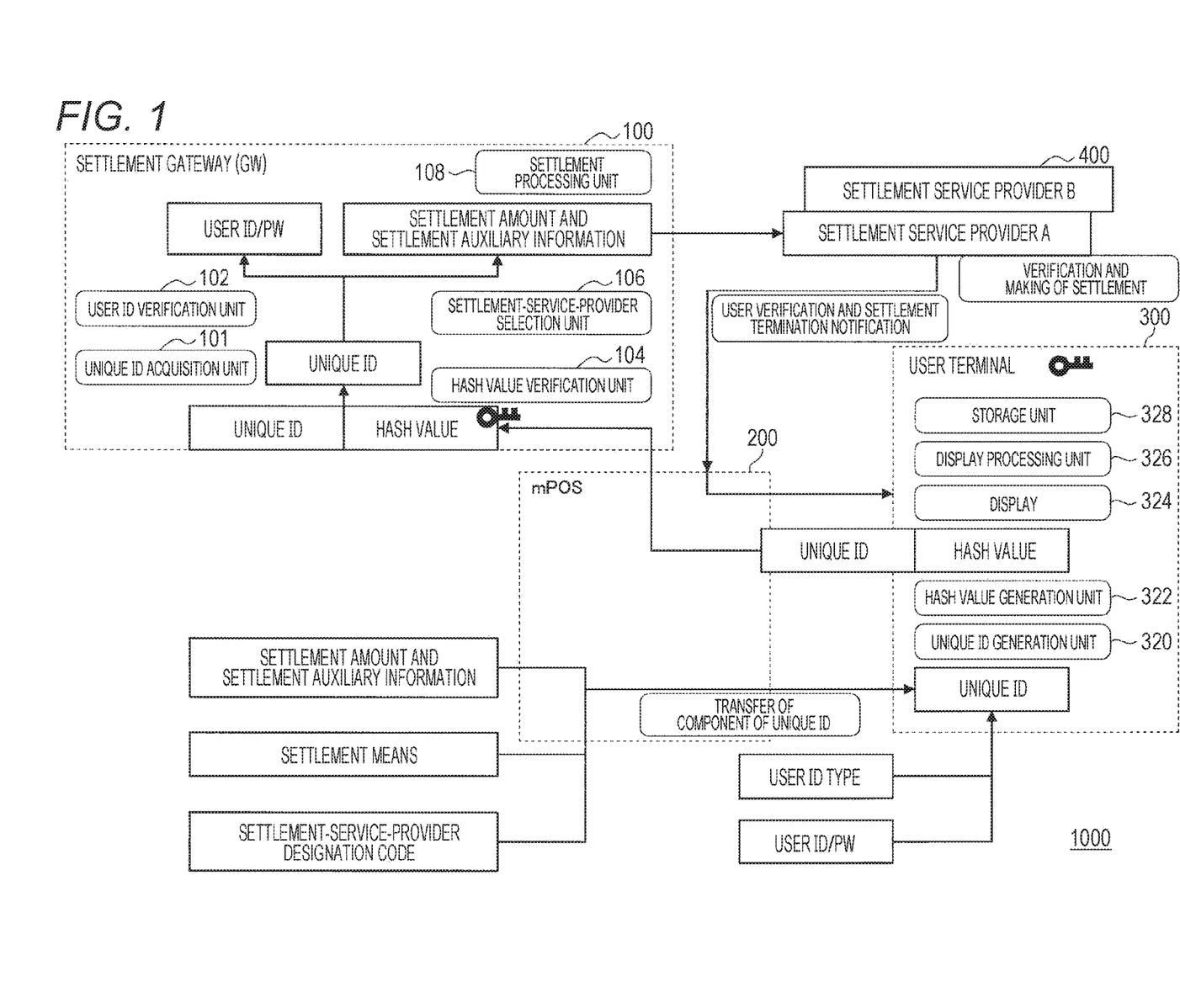
FIG. 1 is a schematic diagram illustrating the configuration of a system according to one embodiment of the present disclosure.

First, the configuration of a system 1000 according to one embodiment of the present disclosure will be described with reference to FIG. 1. As illustrated in FIG. 1, the system 1000 according to the embodiment includes a settlement gateway 100, a real-shop terminal 200, a user terminal 300 such as a smartphone, and a server 400 of a settlement service provider.

The settlement gateway 100 manages account information, which is associated with a user of the user terminal 300, and a settlement means. The settlement gateway 100 has a function of mediation. In a case of receiving settlement processing from the user terminal 300, the settlement gateway 100 mediates the settlement processing to a settlement service provider that matches the settlement means. The settlement gateway 100 corresponds to an information processing apparatus according to the present disclosure. The settlement service provider performs settlement processing (credit) designated by a user.

The settlement gateway 100 can communicate with the real-shop terminal 200 and the server 400 of a settlement service provider in a wired or wireless communication way. The real-shop terminal 200 can communicate with the user terminal 300 in a wired or wireless communication way. In particular, the real-shop terminal 200 and the user terminal 300 can communicate with each other in a non-contact communication way such as FeliCa (registered trademark). Note that the way of mutual communication among the settlement gateway 100, the real-shop terminal 200, the user terminal 300, and the server 400 of a settlement service provider are not particularly limited, and various communication ways can be used.

As illustrated in FIG. 1, the settlement gateway 100 includes a unique ID acquisition unit 101, a user ID verification unit (user verification unit) 102, a hash value verification unit 104, a settlement-service-provider selection unit 106, and a settlement processing unit 108. In the embodiment, the user terminal 300 generates a unique ID, which is unique information regarding a settlement. The settlement gateway 100 receives the unique ID via the real-shop terminal 200, verifies the unique ID, and performs settlement processing with the settlement service provider.

In the configuration of the settlement gateway 100 illustrated in FIG. 1, the unique ID acquisition unit 101 acquires the unique ID that has been sent from the user terminal 300 via the real-shop terminal 200. The user ID verification unit 102 verifies a user ID on the basis of the user ID and a user password contained in the unique ID. The hash value verification unit 104 verifies the unique ID on the basis of the hash value. The settlement-service-provider selection unit 106 selects a settlement service provider that makes a settlement on the basis of a settlement-service-provider designation code contained in the unique ID. The settlement processing unit 108 sends information regarding the unique ID to the server 400 of a settlement service provider to allow the settlement service provider selected by the settlement-service-provider selection unit 106 to perform settlement processing. Note that the components such as the settlement gateway 100 illustrated in FIG. 1 can include hardware such as a circuit, a central arithmetic processing apparatus such as a CPU, and a program (software) for causing the apparatus to function.

The real-shop terminal 200 is placed in, for example, a real shop where a user goes shopping. For example, the real-shop terminal 200 corresponds to a real-shop terminal in a system of a mobile point of sales (mPOS). The user terminal 300 corresponds to, for example, a smartphone used by a user. The user terminal 300 is used, for example, in a case where the user buys a product at a real shop or where the user performs prior registration. The server 400 of a settlement service provider is an information processing apparatus used in a case where the settlement service provider makes a settlement.

In the embodiment, the real-shop terminal 200 has a basic function of passing information between the user terminal 300 and the settlement gateway 100. In a case of receiving a settlement instruction from the user terminal 300, the settlement gateway 100 performs processing for a settlement together with a settlement service provider. As a result, the real-shop terminal 200 can have versatility. Even in a case where settlement service of a new settlement service provider is introduced in a real shop, the real-shop terminal 200 is not required to be modified.

The user terminal 300 includes a unique ID generation unit 320 and a hash value generation unit 322. The unique ID generation unit 320 generates a unique ID. The hash value generation unit 322 generates a hash value of the unique ID. Furthermore, the user terminal 300 includes a display (LCD) 324, a display processing unit 326, and a storage unit 328. The display 324 displays, for example, a settlement means on a screen. The display processing unit 326 performs processing for display various pieces of information on the display 324. The storage unit 328 stores, for example, a user ID type, a user ID, and a user password.

Note that, in the embodiment, the settlement way refers to, for example, a method of authentication of a user, a settlement means, and a data encryption way with a terminal. Furthermore, the method of authentication refers to a way using a PIN code or 3D Secure in a case of a credit type.

3. PRIOR REGISTRATION PROCESSING

Figure 2:
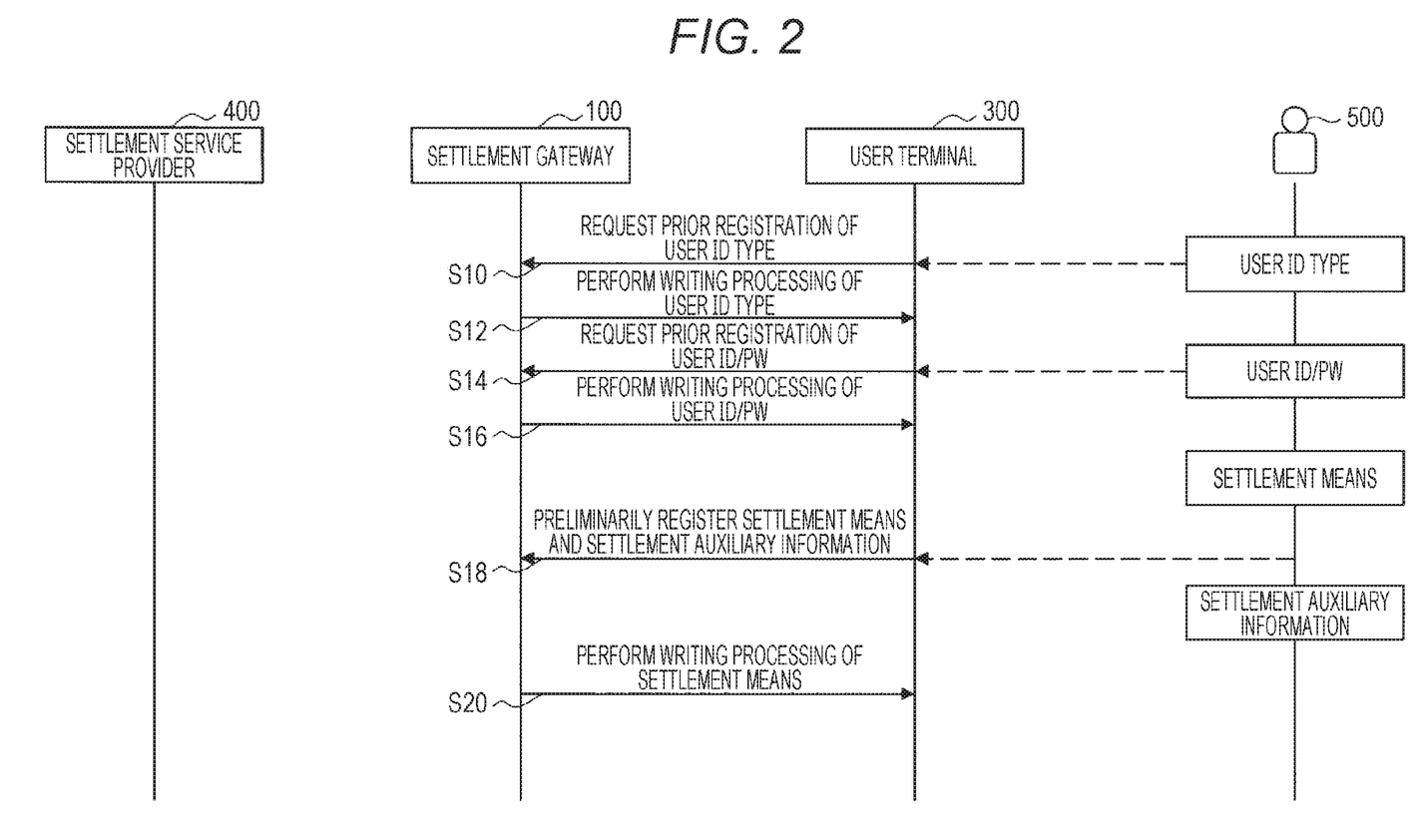
FIG. 2 is a sequence diagram illustrating the flow of prior preparation.
Figure 3:
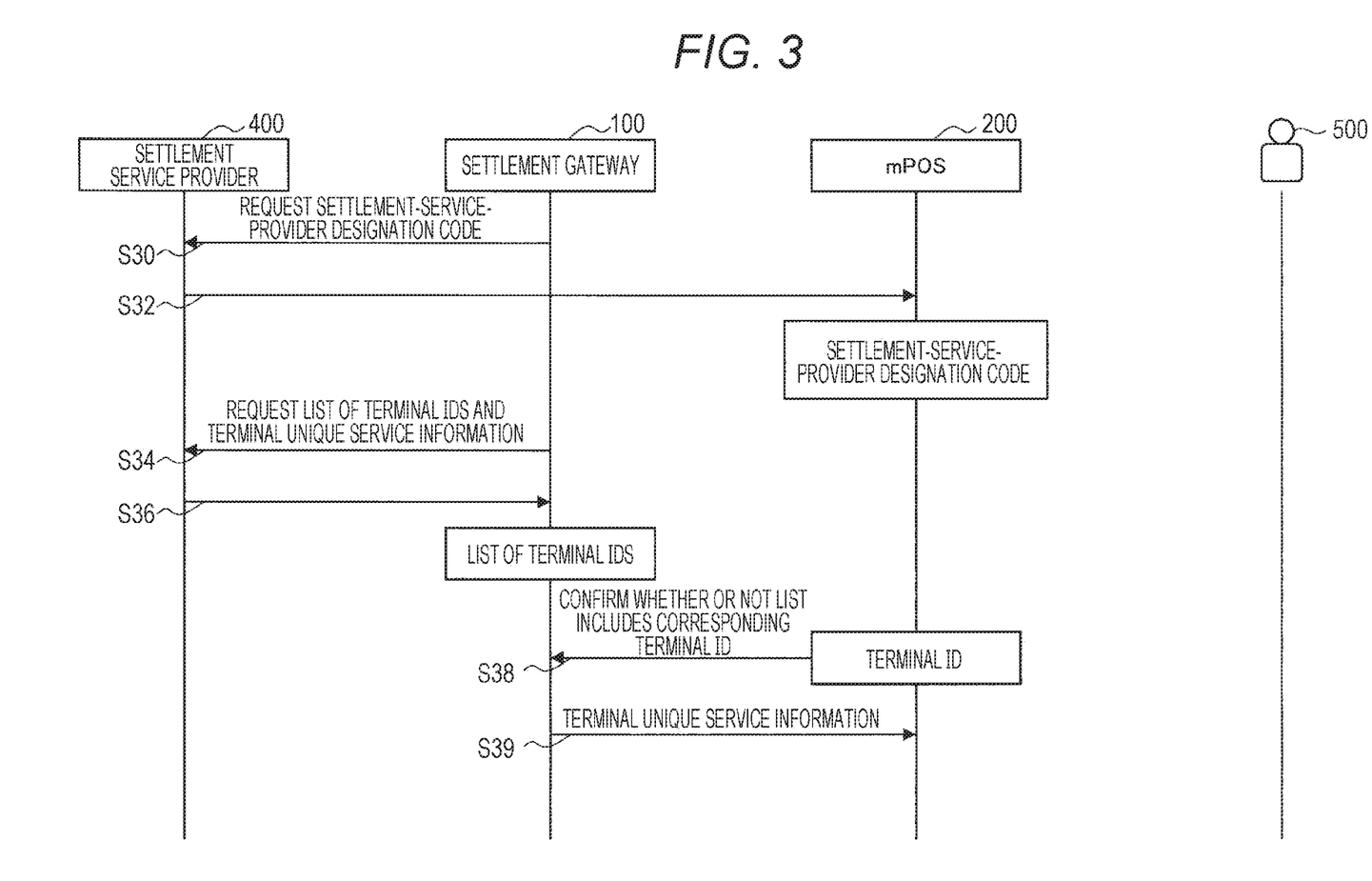
FIG. 3 is a sequence diagram illustrating the flow of the prior preparation.

In the embodiment, prior registration is performed before a user makes a settlement at a real shop. FIGS. 2 and 3 are sequence diagrams illustrating the flow of prior preparation. First, in Step S10 in FIG. 2, a user 500 operates the user terminal 300 to request the prior registration of a user ID type from the settlement gateway 100. The user ID type refers to an account type of the user. Examples of the account type include a mail account, an account of a unique ID of a user, and the like.

In the next Step S12, the settlement gateway 100 performs writing processing of the user ID type to the user terminal 300. For example, in a case where the user terminal 300 is mounted with a FeliCa chip that also functions as the storage unit 328, the user ID type is written in the FeliCa chip.

In the next Step S14, the user 500 operates the user terminal 300 to request the prior registration of a user ID and a user password (PW) from the settlement gateway 100. The user ID indicates an ID of an account of a user. The user PW corresponds to a password associated with an account ID of the user. In one example, in a case where the user ID type is a mail account, the user ID corresponds to an ID of a mail account, such as xxx@yahaa.co.jp and xxx@gaogle.com, used by the user on the Internet. Furthermore, for example, in a case where the user ID type is a unique number, the user ID corresponds to a unique number such as XXXX.

In the next Step S16, the settlement gateway 100 performs writing processing of the user ID and the user password to the user terminal 300. For example, in a case where the user terminal 300 is mounted with a FeliCa chip, the user ID and the user password is written in the FeliCa chip.

In the next Step S18, the user 500 operates the user terminal 300 to request the prior registration of a settlement means and settlement auxiliary information from the settlement gateway 100. The settlement means refers to a means for settlement, and corresponds to, for example, electronic money, a credit card, a QR code (registered trademark), and the like. The settlement auxiliary information supplements the settlement means, and corresponds to, for example, the type of electronic money in a case of electronic money, a credit card number (primary account number: PAN) in a case of a credit card, and the like.

In the next Step S20, the settlement gateway 100 performs writing processing of the settlement means and the settlement auxiliary information to the user terminal 300. For example, in a case where the user terminal 300 is mounted with a FeliCa chip, the settlement means and the settlement auxiliary information are written in the FeliCa chip.

After the processing in FIG. 2, the processing in FIG. 3 is performed. In the processing in FIG. 3, preparation is made to provide unique service mainly for a specific real shop. In Step S30, the settlement gateway 100 requests the settlement-service-provider designation code from the server 400 of a settlement service provider. The settlement-service-provider designation code is individually designated by the settlement service provider.

In the next Step S32, the server 400 of the settlement service provider sends the settlement-service-provider designation code to the real-shop terminal 200. Thus, the settlement-service-provider designation code is held in the real-shop terminal 200.

In the next Step S34, the settlement gateway 100 requests a list of terminal IDs of the real-shop terminals 200 and terminal unique service information from the server 400 of a settlement service provider. The terminal ID (identification information) is used for identifying the real-shop terminal 200. Furthermore, the terminal unique service information refers to unique service information, associated with the real-shop terminal 200, defined by the settlement service provider. In one example, the terminal unique service information corresponds to information regarding a special discount applied only to the specific terminal 200. Note that the terminal unique service information may be unique service information associated with the user terminal 300.

In the next Step S36, the server 400 of the settlement service provider sends the list of terminal IDs of the real-shop terminals 200 and the terminal unique service information to the settlement gateway 100. Thus, the list of terminal IDs of the real-shop terminal 200 is held in the settlement gateway 100. The list of terminal IDs is associated with the terminal unique service information. For example, a special discount can be performed only in the real shop 200 in a specific area by the server 400 of a settlement service provider imparting the terminal unique service information to the real-shop terminal 200 in the specific area.

In the next Step S38, the real-shop terminal 200 requests the settlement gateway 100 to confirm whether or not a list of terminal IDs includes the terminal ID of the real-shop terminal 200. In the next Step S39, the settlement gateway 100 determines whether or not the list of terminal IDs includes the ID of the terminal 200, confirmation of which has been requested in Step S38. In a case where the list includes the ID of the terminal 200, the settlement gateway 100 sends the terminal unique service information to the terminal 200. This enables the real-shop terminal 200 to receive the terminal unique service information and give the above-described special discount at the time of settlement.

4. SETTLEMENT PROCESSING

Figure 4:
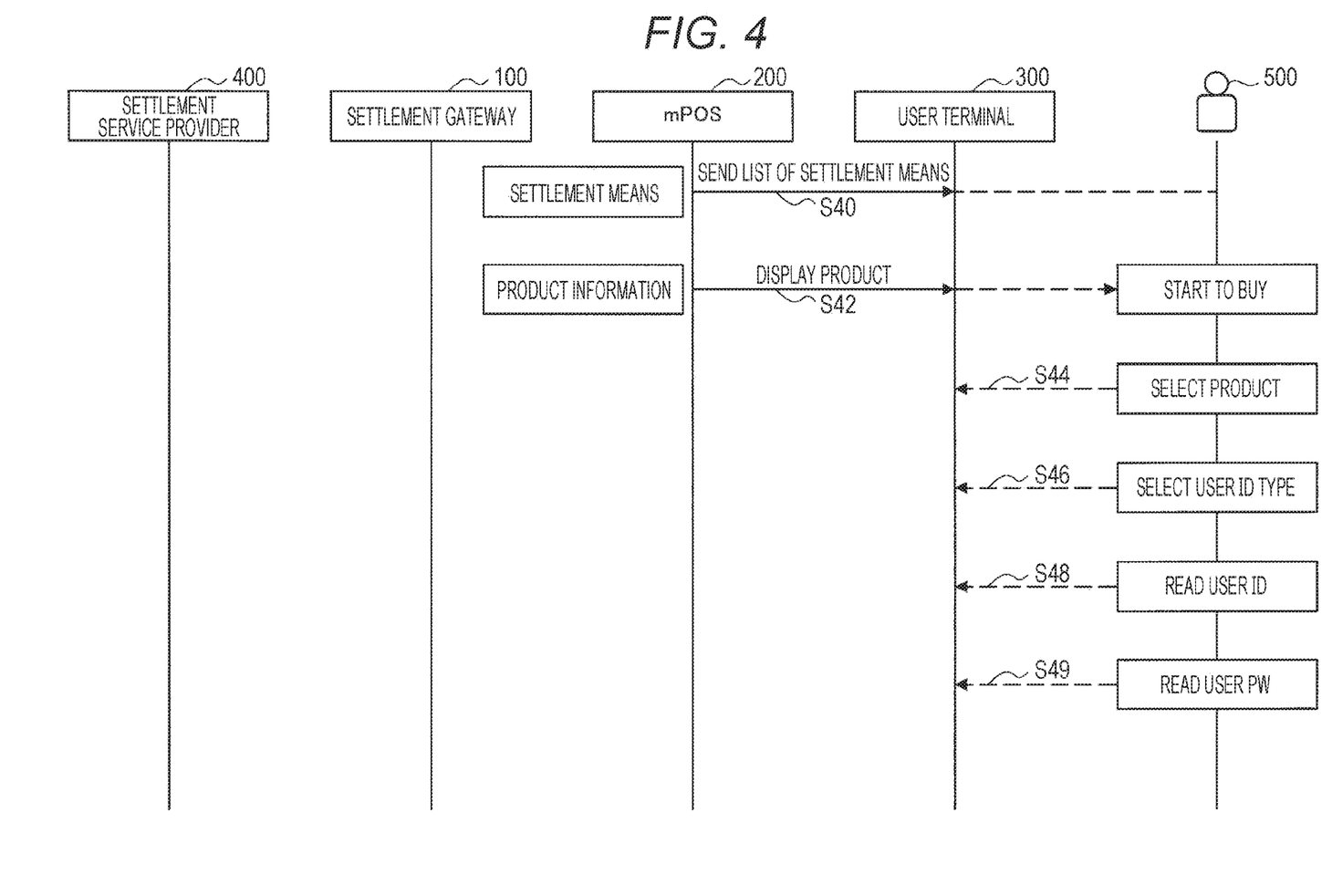
FIG. 4 is a sequence diagram illustrating the flow of a settlement.
Figure 5:
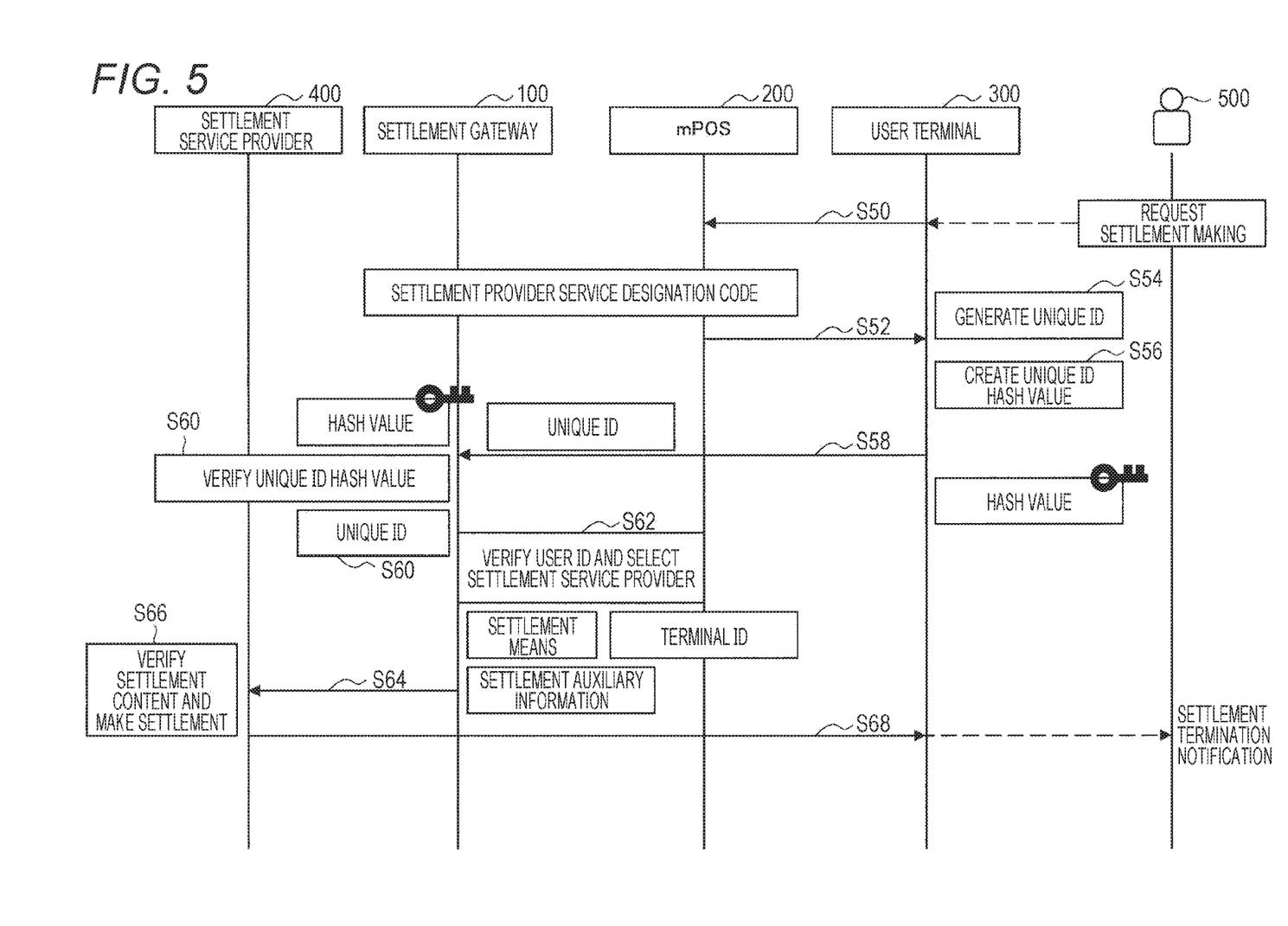
FIG. 5 is a sequence diagram illustrating the flow of the settlement.

After the prior preparation in FIGS. 2 and 3, the user terminal 300 can make a settlement. FIGS. 4 and 5 are sequence diagrams illustrating the flow of a settlement. First, in Step S40 of FIG. 4, the real-shop terminal 200 sends a list of settlement means to the user terminal 300. Here, a list of settlement means (e.g., electronic money, a credit card, a QR code (registered trademark)) that can be used in a case where the user 500 makes a settlement is sent. The real-shop terminal 200 can determine a list of available settlement means on the basis of the settlement-service-provider designation code transmitted from the server 400 of the settlement service provider in Step S32 in FIG. 3.

In the next Step S42, the real-shop terminal 200 sends information regarding a product to be bought by the user 500 to the user terminal 300. In a manner similar to that in a usual shop, the terminal 200 reads product information with, for example, a bar-code reader or the like, and sends the information to the user terminal 300. The product information includes a product name, a price, and the like. In the next Step S44, the user 500 operates the user terminal 300 to select a product. In the next Step S46, the user 500 operates the user terminal 300 to select a user ID type. As described above, the user ID type represents the account type of a user, and corresponds to, for example, a mail account and an account of a unique ID of the user.

In the next Step S48, the user 500 operates the user terminal 300 to cause the user terminal 300 to read the user ID. In the next Step S49, the user 500 operates the user terminal 300 to cause the user terminal 300 to read the user password (PW). The user ID type, the user ID corresponding to the user ID type, and the user password are preliminarily stored in the user terminal 300 by the above-described prior registration. Thus, the user ID corresponding to the user ID type and the user password can be read in Steps S46, S48, and S49. Thus, the user is not required to newly input these pieces of information, and can operate the user terminal 300 more easily.

After the processing in FIG. 4, the processing in FIG. 5 is performed. In Step S50 in FIG. 5, the user 500 operates the user terminal 300 to designate a settlement means and request the real-shop terminal 200 to make a settlement. The settlement means can be designated on the basis of the list of settlement means received in Step S40 in FIG. 4. Note that the real-shop terminal 200 has acquired the terminal unique service information through the processing of Step S39 in FIG. 3. Thus, the user can recognize the terminal unique service information by providing the terminal unique service information together with the list of settlement means to the user terminal 300 and displaying the terminal unique service information on the display 324 of the user terminal 300 in the processing of Step S40 in FIG. 4. Thus, in a case of designating a settlement means, a settlement means with a special discount from terminal unique service can be designated.

In the next Step S52, the real-shop terminal 200 sends the settlement-service-provider designation code corresponding to the designated settlement means to the user terminal 300. In the next Step S54, the user terminal 300 generates a unique ID. In the next Step S56, the user terminal 300 generates a hash value of the unique ID.

Figure 6:
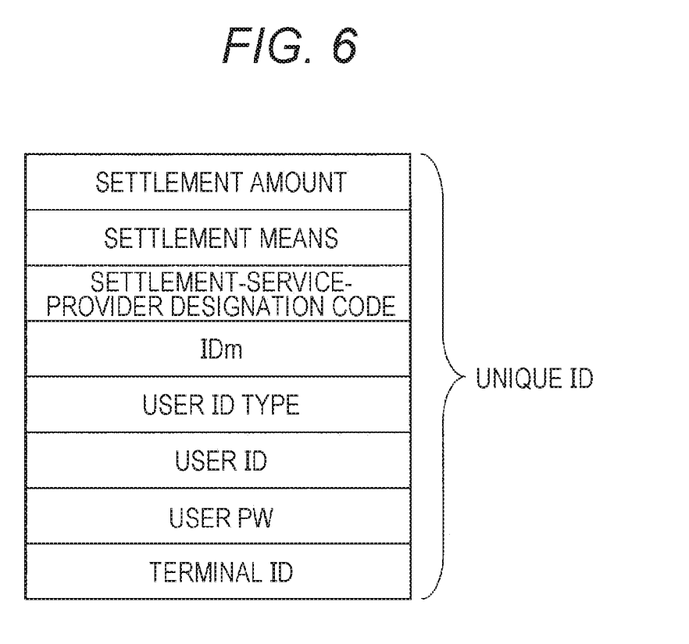
FIG. 6 is a schematic diagram illustrating the data structure of a unique ID.

FIG. 6 is a schematic diagram illustrating the data structure of a unique ID. As illustrated in FIG. 6, the unique ID is an aggregate of information of a settlement amount, a settlement means, a settlement-service-provider designation code, an IDm, a user ID type, a user ID, a user password, and a terminal ID of the real-shop terminal 200. Here, the IDm represents a unique number assigned to a card. A real-shop terminal ID is sent from the real-shop terminal 200 to the user terminal 300 in, for example, Step S52.

Figure 7:
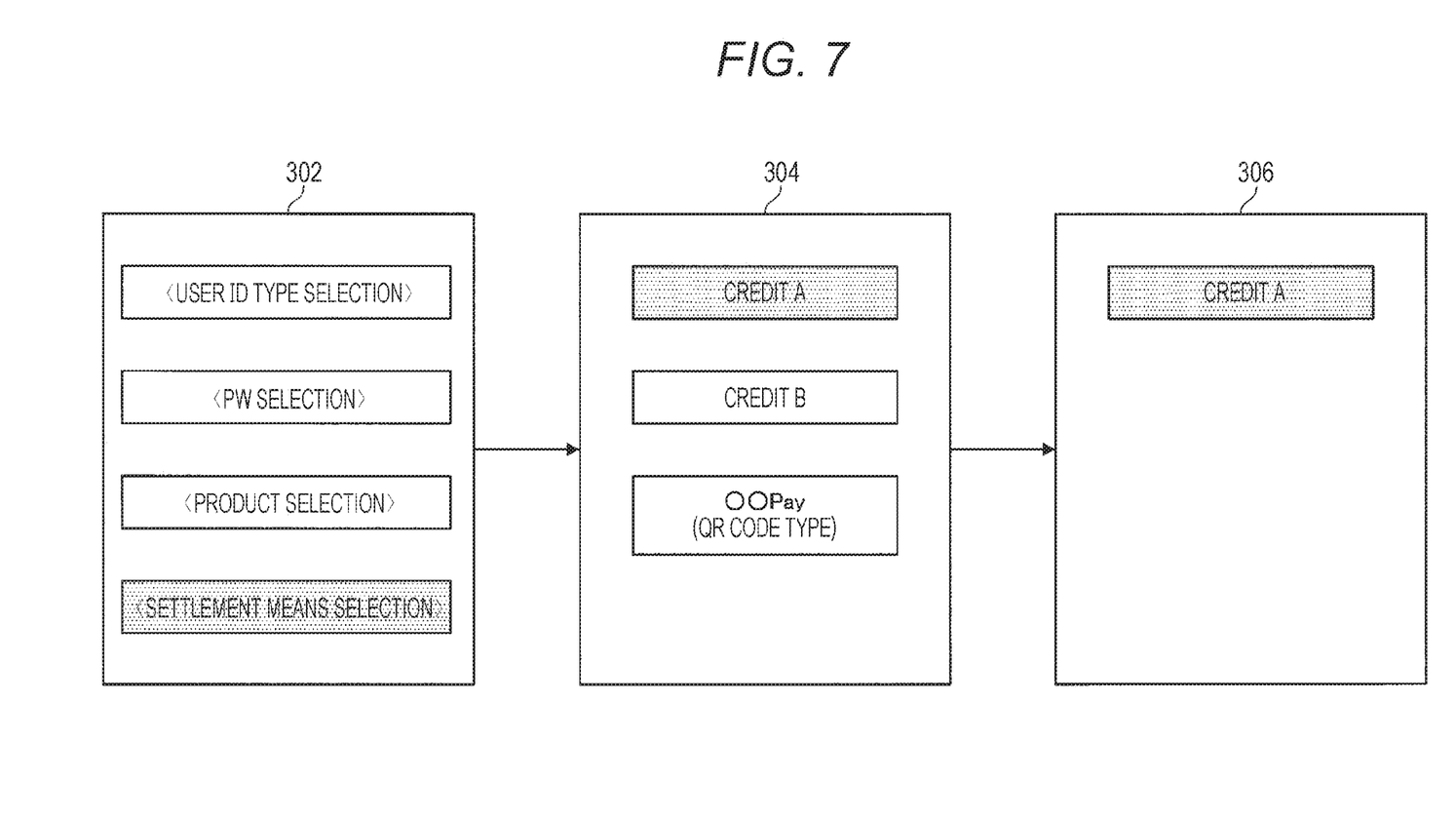
FIG. 7 is a schematic diagram illustrating an example of a selection screen of a settlement means.

FIG. 7 is a schematic diagram illustrating an example of a selection screen of the settlement means in a case of requesting settlement-making in Step S50. FIG. 7 illustrates how a screen of the user terminal 300 transitions in response to operation of the user 500. First, as illustrated in a left screen 302 in FIG. 7, the user 500 selects "settlement means selection" with the top screen of the user terminal 300 being displayed. This causes the transition to a screen 304 illustrated in a central figure in FIG. 7. A plurality of settlement means that can be handled on the side of the real-shop terminal 200 is displayed. In the central screen 304 in FIG. 7, "credit A", which is set by default, is automatically selected. This causes the transition to a screen 306 illustrated in a right figure in FIG. 7. The "credit A", which is a selected settlement means, is displayed. A user ID associated with the "credit A" is automatically registered in the unique ID. In a case where the user desires to select a settlement means other than the "credit A" set by default, the user can select another settlement means on the central screen 304 in FIG. 7.

Figure 8:
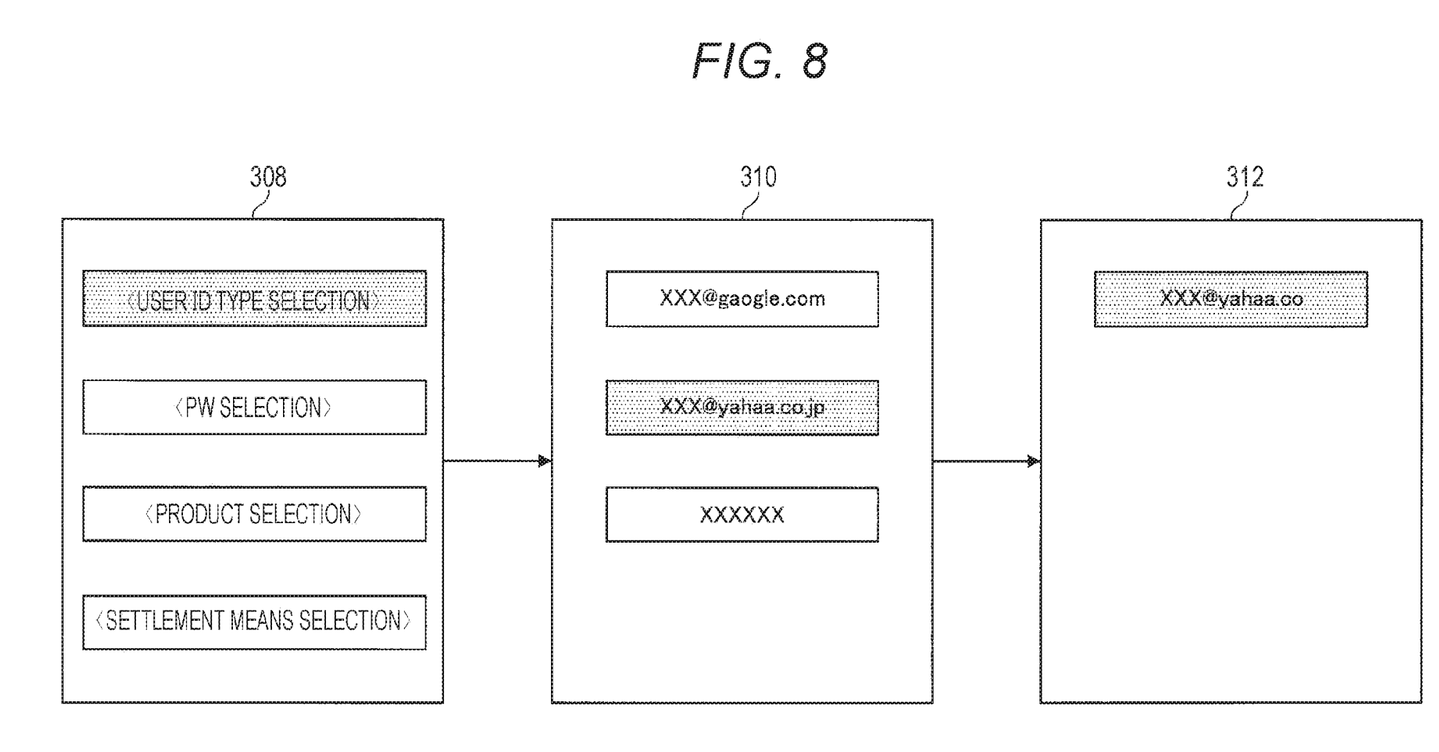
FIG. 8 is a schematic diagram illustrating an example of a screen for selecting the type of a user ID.

FIG. 8 is a schematic diagram illustrating an example of a screen for selecting the type of user ID in generating the unique ID in Step S54. FIG. 8 illustrates how the screen of the user terminal 300 transitions in response to operation of the user 500. First, as illustrated in a left screen 308 in FIG. 8, the user 500 selects "user ID type selection" with the top screen of the user terminal 300 being displayed. This causes the transition to a screen 310 illustrated in a central figure in FIG. 8. A screen indicating a plurality of user ID types is displayed. In the central screen in FIG. 8, "XXX@yahaa.com", which is set by default, is automatically registered in the unique ID. This causes the transition to a screen 312 illustrated in a right figure in FIG. 8. The "XXX@yahaa.com", which is the registered user ID type, is displayed. In a case where the user desires to select a user ID type other than the "XXX@yahaa.com" set by default, the user can select another user ID type on the central screen 310 in FIG. 8. Since the user ID type, the user ID, and the user password are associated with one another, the user ID and the user password can be automatically registered in the unique ID by automatically registering the user ID type in the unique ID.

After Step S56 in FIG. 5, the processing proceeds to Step S58. In Step S58, the user terminal 300 sends the unique ID and the hash value to the settlement gateway 100. In the next Step S60, the settlement gateway 100 verifies the hash value of the unique ID, and verifies whether or not the unique ID is falsified, for example. The settlement gateway 100 then obtains a proper unique ID. In the next Step S62, the settlement gateway 100 verifies the user ID obtained from the unique ID. Furthermore, in Step S62, the settlement gateway 100 selects the settlement service provider on the basis of the settlement-service-provider designation code obtained from the unique ID. At the same time, the settlement gateway 100 acquires information regarding, for example, the settlement means, the terminal ID, and a card unique number from the unique ID.

In the next Step S64, the settlement gateway 100 sends information regarding, for example, the settlement means, the terminal ID, and the card unique number obtained from the unique ID to the server 400 of the settlement service provider selected on the basis of the settlement-service-provider designation code. In the next Step S66, the server 400 of the settlement service provider verifies settlement content, and makes the settlement. In the next Step S68, the server 400 of the settlement service provider sends a settlement termination notification to the user terminal 300.

As described above, the settlement gateway 100 can select a settlement service provider on the basis of the settlement-service-provider designation code by sending information regarding the unique ID, which is an aggregate of information regarding settlement, from the user terminal 300 to the settlement gateway 100. Furthermore, the settlement gateway 100, which has received the unique ID, can acquire information regarding, for example, the settlement means, the terminal ID, and a card unique number. Thus, sending these pieces of information from the settlement gateway 100 to the server 400 of the settlement service provider enables a settlement in accordance with the unique ID.

Furthermore, the server 400 of the settlement service provider can determine whether or not to apply a special discount that is applied only to the specific terminal 200 in a settlement by receiving the real-shop terminal ID from the settlement gateway 100. In a case where the real-shop terminal ID which has been sent from the settlement gateway 100 corresponds to a terminal to which the special discount is applied, the settlement service provider applies the special discount in the settlement.

5. PROCESSING PERFORMED IN USER TERMINAL

Figure 9:
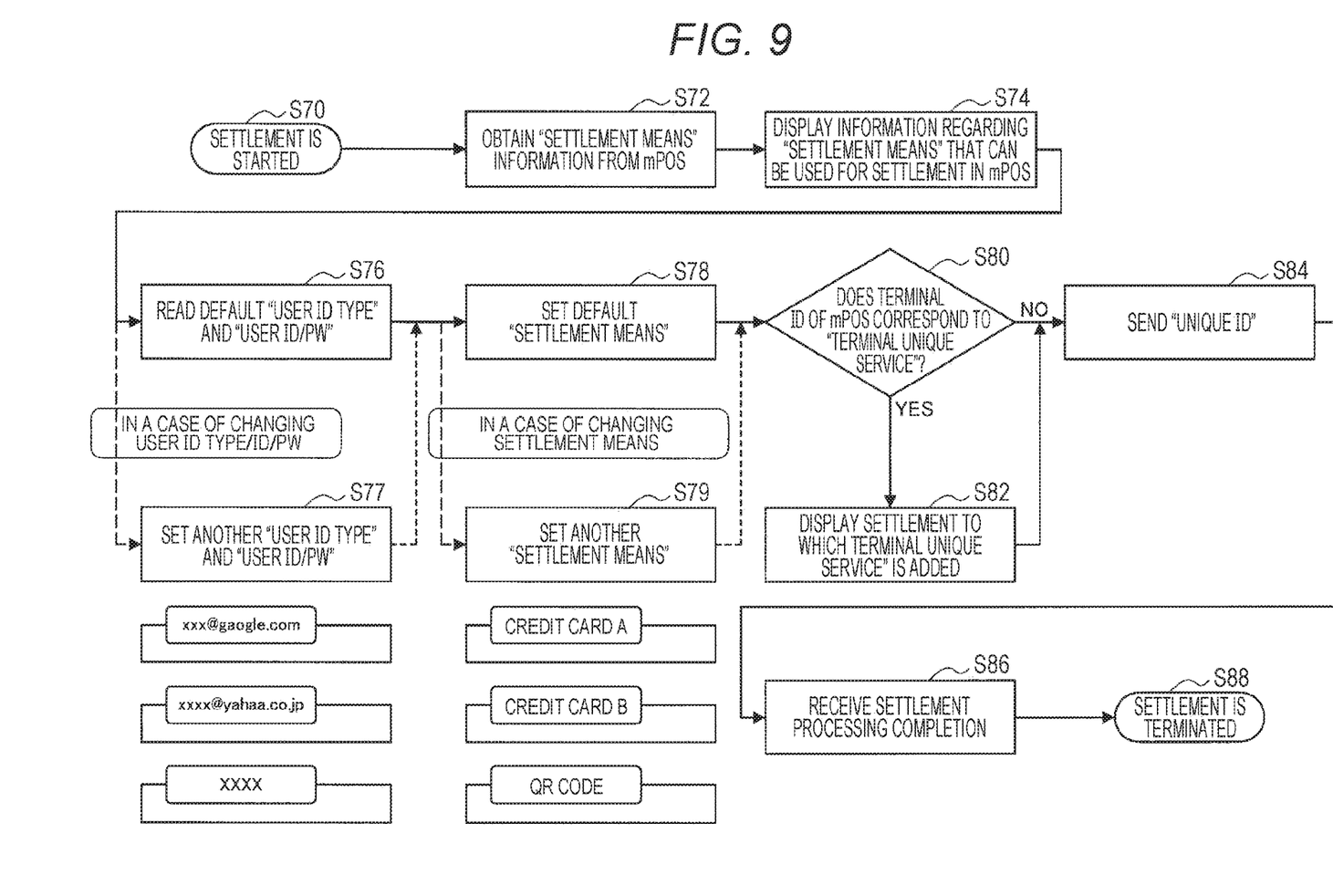
FIG. 9 is a flowchart illustrating processing performed in a user terminal.

FIG. 9 is a flowchart illustrating processing performed in the user terminal 300. First, settlement processing is started in Step S70. In the next Step S72, information regarding a settlement means is obtained from the real-shop terminal 200. In the next Step S74, as illustrated in FIG. 7, the settlement means that can be used for a settlement in the real-shop terminal 200 is displayed on the display 324 of the user terminal 300. The user selects a settlement means on the basis of the screen display of the display 324. The selected settlement means is incorporated into the unique ID.

In the next Step S76, the default "user ID type" and "user ID/password PW" are read. In a case of changing the "user ID type" and the "user ID/password PW", another "user ID type" and "user ID/password PW" are set (Step S77).

In the next Step S78, as illustrated in FIG. 7, the settlement means is set to a default "settlement means". As described in FIG. 7, in a case where the user 500 does not particularly change the settlement means, the default settlement means is automatically registered in the unique ID. In a case of changing the settlement means, another "settlement means" is set (Step S79). In a case where the settlement means has been changed, the changed settlement means is automatically registered in the unique ID.

In the next Step S80, it is determined whether or not the terminal ID of the real-shop terminal 200 corresponds to the "terminal unique service". In a case where the terminal ID corresponds to the terminal unique service, the processing proceeds to Step S82. The settlement to which the "terminal unique service" is added is displayed. The processing proceeds to Step S84, where the unique ID is sent. In contrast, in a case where the terminal ID of the real-shop terminal 200 does not correspond to the "terminal unique service" in Step S80, the processing proceeds to Step S84 without proceeding to Step S82. As described above, the user terminal 300 can determine whether or not the real-shop terminal 200 corresponds to the terminal unique service by providing the terminal unique service information together with the list of settlement means to the user terminal 300 in the processing of Step S40 in FIG. 4.

After Step S84, the processing proceeds to Step S86. In Step S86, settlement processing completion is received. After Step S86, the processing proceeds to Step S88, and the settlement is terminated.

6. EXAMPLE OF DATA MANAGEMENT IN SETTLEMENT GATEWAY

Figure 10:
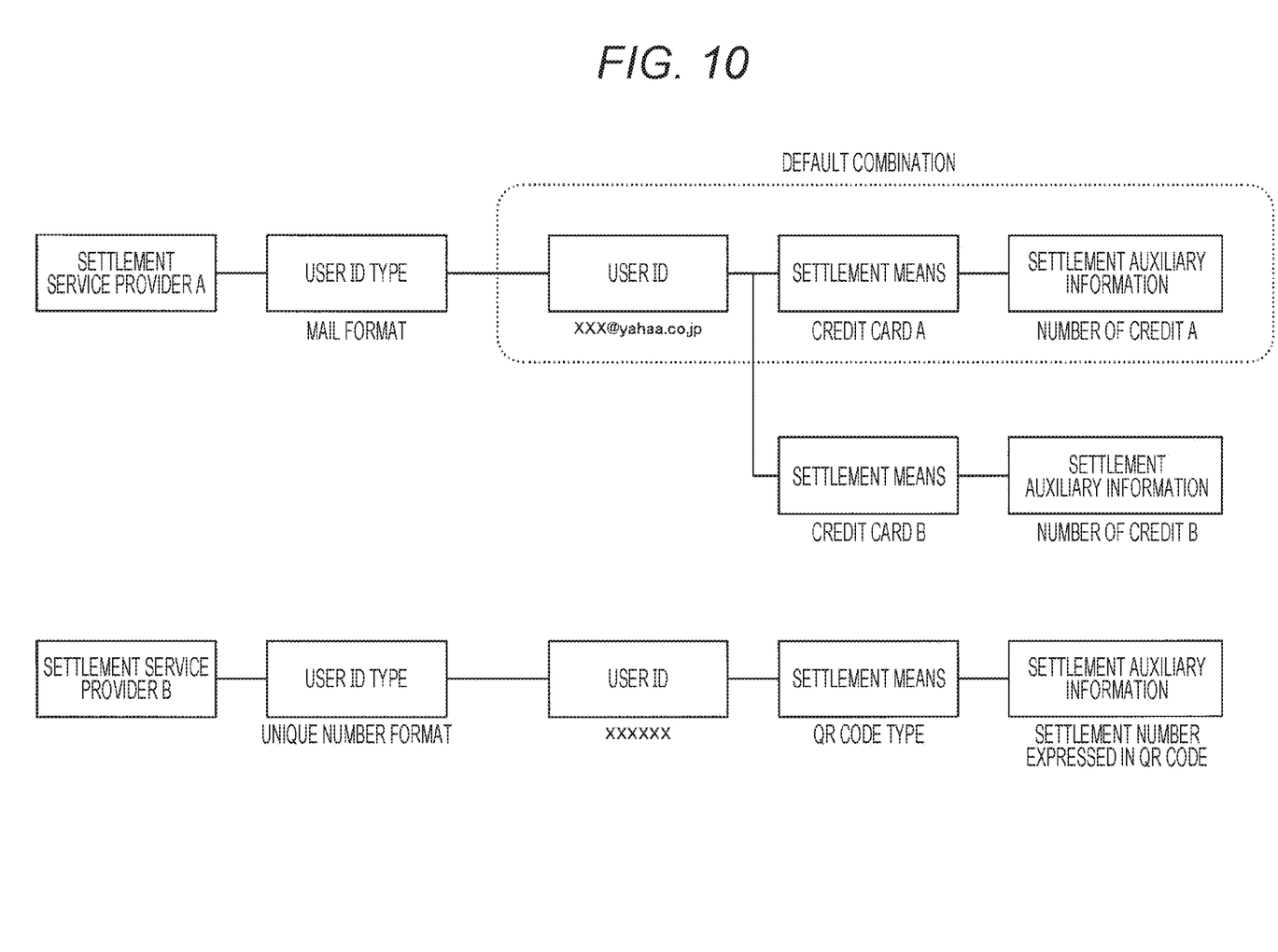
FIG. 10 is a schematic diagram illustrating an example of data management in a settlement gateway.

FIG. 10 is a schematic diagram illustrating an example of data management in the settlement gateway 100. In the example in FIG. 10, the user ID type of a user who uses a settlement service provider A is in a mail format. In the default setting, the user ID is "xxx@yahaa.co.jp", the settlement means is a credit card A, and the settlement auxiliary information is the card number of the credit card A. The user can change the settlement means to a credit card B and the settlement auxiliary information to the card number of the credit card B by changing the default setting.

Furthermore, in the example in FIG. 10, the user ID type of a user who uses a settlement service provider B is in a unique number format. The user ID, the settlement means, and the settlement auxiliary information are settlement numbers respectively expressed in "xxxxxx", a QR code (registered trademark) format, and the QR code (registered trademark).

As described above, according to the embodiment, a settlement can be made by sending the unique ID from the user terminal 300 to the settlement gateway 100 and using an account used by the user, for example, on the Internet during shopping at a real shop. This enables a settlement with simple operation without providing information regarding, for example, a credit card during shopping. Furthermore, the real-shop terminal 200 is only required to have a function of passing information by sending the unique ID from the user terminal 300 to the settlement gateway 100. The terminal 200 can support various settlement means without modifying the terminal 200.

The preferred embodiment of the present disclosure has been described in detail above with reference to the accompanying drawings, but the technical scope of the present disclosure is not limited to such an example. It is obvious that a person having ordinary skill in the art of the present disclosure can arrive at various alternations or modifications within the scope of the technical ideas set forth in the claims. These alternations or modifications are understood to naturally fall within the technical scope of the present disclosure.

Furthermore, the effects described herein are merely illustrative or exemplary, and not limitative. That is, the technique according to the present disclosure may have other effects that are obvious to a skilled person from the description of the present specification, together with or in place of the above-described effects.

Note that, the configurations as described below also fall within the technical scope of the present disclosure.

(1) An information processing apparatus including:

a unique information acquisition unit that acquires unique information, regarding a settlement at a real shop, generated by a user terminal via a real-shop terminal;

a verification unit that verifies the unique information; and a settlement processing unit that sends the unique information to a settlement service provider so that the settlement service provider performs settlement processing on the basis of the unique information.

(2) The information processing apparatus according to (1) above, in which the unique information includes settlement-service-provider designation information for designating the settlement service provider, and the information processing apparatus further includes a settlement-service-provider selection unit that selects the settlement service provider on the basis of the settlement-service-provider designation information.

(3) The information processing apparatus according to (1) or (2) above, in which the unique information includes terminal identification information for the real-shop terminal, and the settlement service provider performs the settlement processing on the basis of the terminal identification information.

(4) The information processing apparatus according to (3) above, in which the settlement service provider applies unique service corresponding to the real-shop terminal on the basis of the terminal identification information, and performs the settlement processing.

(5) The information processing apparatus according to any one of (1) to (4) above, in which the unique information includes information regarding an account of a user who uses the user terminal and a password of the account.

(6) The information processing apparatus according to (5) above, in which the unique information includes information regarding a settlement associated with the account.

(7) The information processing apparatus according to (6) above, in which the information regarding a settlement relates to a credit card.

(8) The information processing apparatus according to (5) above, further including a user verification unit that verifies the user on the basis of the information regarding an account and the password.

(9) The information processing apparatus according to any one of (1) to (8) above, further including a hash value acquisition unit that acquires a hash value of the unique information via the real-shop terminal, the hash value being generated by the user terminal, in which the verification unit verifies the unique information on the basis of the hash value.

(10) An information processing system including:

a user terminal that generates unique information regarding a settlement at a real shop;

a real-shop terminal that is installed in a real shop and that acquires the unique information from the user terminal;

an information processing apparatus including: a unique information acquisition unit; a verification unit; and a settlement processing unit, the unique information acquisition unit acquiring the unique information from the real-shop terminal, the verification unit verifying the unique information, the settlement processing unit sending the unique information to a settlement service provider so that the settlement service provider performs settlement processing on the basis of the unique information; and a settlement-service-provider terminal that corresponds to a terminal of the settlement service provider and makes a settlement on the basis of the unique information.

REFERENCE SIGNS LIST

100 Settlement gateway
102 User ID verification unit
104 Hash value verification unit
106 Settlement-service-provider selection unit
108 Settlement processing unit
200 Real-shop terminal
300 User terminal
400 Terminal of settlement service provider

The invention claimed is:

1. An information processing apparatus, comprising:
circuitry configured to:
receive terminal identification information of a real-shop terminal;
determine terminal unique service information is applicable to the real-shop terminal based on the terminal identification information;
transmit the terminal unique service information to the real-shop terminal based on the determination;
acquire unique information, regarding a settlement at a real shop, from a user terminal via the real-shop terminal,
wherein the unique information includes settlement-service-provider designation information, information related to a settlement amount, and a settlement means associated with the terminal unique service information;
acquire a hash value of the unique information from the user terminal via the real-shop terminal;
verify the hash value;
verify, based on the verification of the hash value, the unique information that includes the settlement-service-provider designation information;
select a settlement service provider based on the settlement-service-provider designation information and the verification of the unique information; and
send the unique information to the selected settlement service provider, wherein the selected settlement service provider:
applies a unique service corresponding to the real-shop terminal based on the terminal identification information of the real-shop terminal and the terminal unique service information, wherein the application of the unique service includes an application of a discount amount on the settlement amount; and
execute a settlement process based on the unique information and the application of the unique service.

2. The information processing apparatus according to claim 1, wherein the unique information further includes information regarding an account of a user associated with the user terminal and a password of the account.

3. The information processing apparatus according to claim 2, wherein the unique information further includes information regarding the settlement means associated with the account.

4. The information processing apparatus according to claim 3, wherein the information regarding the settlement means relates to a credit card.

5. The information processing apparatus according to claim 2, wherein the circuitry is further configured to verify the user based on the information regarding the account and the password.

6. An information processing system, comprising:
a user terminal configured to generate each of unique information regarding a settlement at a real shop and a hash value of the unique information;
a real-shop terminal installed in the real shop,
wherein the real-shop terminal is configured to acquire the unique information and the hash value of the unique information from the user terminal, and
the unique information includes settlement-service-provider designation information, information related to a settlement amount, and a settlement means associated with terminal unique service information;
an information processing apparatus including circuitry configured to:
receive terminal identification information of the real-shop terminal;

determine the terminal unique service information is applicable to the real-shop terminal based on the terminal identification information;
transmit the terminal unique service information to the real-shop terminal based on the determination;
acquire the unique information from the real-shop terminal;
acquire the hash value of the unique information from the real-shop terminal;
verify the hash value;
verify, based on the verification of the hash value, the unique information that includes the settlement-service-provider designation information;
select a settlement service provider based on the settlement-service-provider designation information and the verification of the unique information; and
send the unique information to the selected settlement service provider,
wherein the selected settlement service provider is configured to:
apply a unique service corresponding to the real-shop terminal based on the terminal identification information of the real-shop terminal and the terminal unique service information, wherein the application of the unique service includes an application of a discount amount on the settlement amount; and
execute a settlement process based on the unique information and the application of the unique service; and
a settlement-service-provider terminal that corresponds to a terminal of the selected settlement service provider, wherein the settlement-service-provider terminal is configured to make the settlement based on the unique information.

7. The information processing apparatus according to claim 1, wherein the circuitry is further configured to execute a writing process to write a user ID and a user password in a chip mounted on the user terminal.

8. The information processing apparatus according to claim 1, wherein
the circuitry is further configured to execute a writing process to write the settlement means and settlement auxiliary information in a chip mounted on the user terminal, and
the settlement auxiliary information includes information associated with the settlement means.

* * * * *